United States Patent [19]

Hanson

[11] 4,403,365
[45] Sep. 13, 1983

[54] BRUSH ASSEMBLY FOR CLEANING BREAD PANS

[76] Inventor: Douglas R. Hanson, 1720-9th Ave. South, Anoka, Minn. 55303

[21] Appl. No.: 306,215

[22] Filed: Sep. 28, 1981

[51] Int. Cl.³ .................. A47L 15/39; A46B 13/02
[52] U.S. Cl. ........................................ 15/56; 15/77
[58] Field of Search .................. 15/3.13, 3.16.3.17, 15/21 D, 40, 56, 74, 77, 304

[56] References Cited

U.S. PATENT DOCUMENTS

| | | | |
|---|---|---|---|
| 957,074 | 5/1910 | Marshall et al. | 15/40 X |
| 1,158,752 | 11/1915 | Volz | 15/56 |
| 1,676,801 | 7/1928 | Robinson | 15/56 |
| 2,221,159 | 11/1940 | Willard | 15/3.17 |
| 3,999,238 | 12/1976 | Hanson | 15/56 |
| 4,044,420 | 8/1977 | Hanson | 15/304 |

Primary Examiner—Edward L. Roberts
Attorney, Agent, or Firm—Kinney, Lange, Braddock, Westman and Fairbairn

[57] ABSTRACT

A brush assembly is utilized for cleaning pans in which loaves of bread are baked after the pans have been emptied of the bread. The brush assembly is mounted above a conveyor carrying the pans, and includes long bristle brushes rotating about axes oblique with respect to the direction of travel of the pans, and generally parallel to the plane of movement of the pans. The brush assemblies are oscillated up and down as they are rotated so that the brush tips tend to be repeatedly jabbed longitudinally into the corners of the pans to loosen seed, crumbs and other materials left in the pans.

11 Claims, 4 Drawing Figures

BRUSH ASSEMBLY FOR CLEANING BREAD PANS

BACKGROUND OF THE INVENTION

1. Field of the Invention

The present invention relates to brushes for cleaning pans used in bakeries.

2. Description of the Prior Art

My own U.S. Pat. Nos. 3,999,238, Issued Dec. 28, 1976 and 4,044,420, Issued Aug. 30, 1977 each show a brush assembly utilized for cleaning bakery pans, including rotating and linear brushes which were used for brushing and sweeping bun pans to attempt to get seeds, crumbs, and any other material that is left in the pans out prior to the time when the new loaves were placed into the pans. The linear brush is oscillated back and forth to get into the corners of the pans, and the rotary brush is operated in the normal manner. However, in deep pans, in particular for bread loaves, which are sometimes in the range of three inches deep, about four inches across and about sixteen inches long, the corners are very deep and brushes tend to move over the pans without removing all of the braking debris, particularly in the corners.

The device shown in my previous patents mounted over a conveyor belt carrying pans in the same manner as the present device and thus reference to said previous patents will disclose many of the details of mounting and adjustment.

The present device, which places the brushes at oblique angles with respect to the direction of travel and oscillates the brushes up and down at the same time as they rotate serves a need in getting into the deeper corners and removing seeds, baked on crusts, and the like.

SUMMARY OF THE INVENTION

The present invention relates to a brush assembly for removing debris from bakery pans comprising at least one brush rotatably mounted obliquely with respect to the direction of travel of a pan as it is moved past the brush, and means for reciprocating the brush as it rotates so that the ends of the bristles on the brush tend to be poked or jabbed in longitudinal direction of the bristles as the brush oscillates to force the bristles into the pan corners. The rotary action then removes loosen seed, crumbs and the like, and brushes them out of the way.

In the preferred embodiment, two brushes are utilized with their axes positioned obliquely with respect to the direction of travel, and with the axis of the respective brushes also at angles relative to each other. The brushing path of the brushes overlaps and yet the overall width of the brush housing is kept at a minimum. The two brushes in series (tandem) are used with a vacuum head of conventional design downstream from the brushes as the pans move which will remove debris from the pan after the brushes loosen it. The vacuum head will even suck complete loaves of bread up into the vacuum system if a loaf happens to remain in the pan after it normally would have been removed.

The entire brush assembly can be raised and lowered relative to the conveyor in the manner shown in my previous patents by having support rods which can be rotated through the use of a crank or height adjustment.

DETAILED DESCRIPTION OF THE PREFERRED EMBODIMENT

The general relationship of the housing and the brushes that are used in the present device for cleaning pans is shown in my U.S. Pat. Nos. 3,999,238, issued Dec. 28, 1976 and 4,044,420, issued Aug. 30, 1977 and thus the mechanisms for supporting and driving the conveyors and supporting the main housing and also the drives for the brushes are shown schematically in the present disclosure. The orientation of the brushes, however, and the ability to pivot the brushes up and down forms the crux of the present invention.

Figure 1:
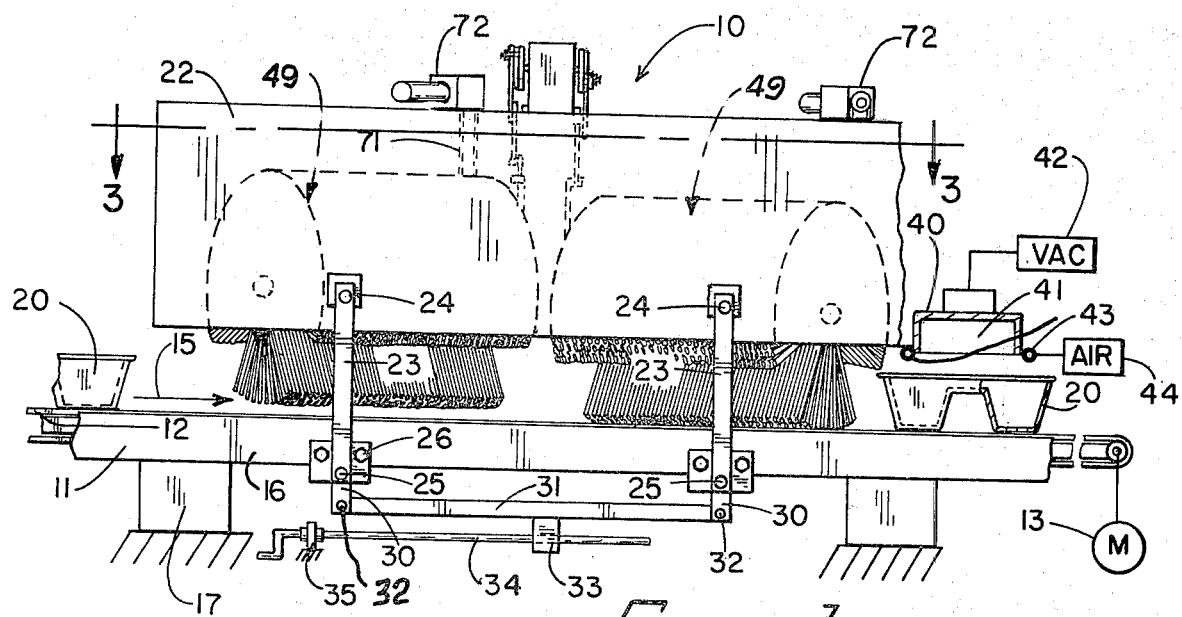
FIG. 1 is a fragmentary side elevational view of a brush assembly for cleaning bread pans made according to the present invention and shown partly schematically.

Referring to FIG. 1, a bread pan cleaning machine indicated generally at 10 comprises a conveyor assembly 11 which includes a conveyor belt 12 driven by a motor 13 which drives belt support rollers in a normal manner for moving the belt in direction as indicated by the arrow 15. The frame 16 of the conveyor has side members and is supported on suitable legs or supports indicated at 17.

The belt 12 is designed to carry a plurality of bread pans 20. Normally these bread pans 20 are in the range of three inches deep, and generally are in a cluster or unit that may be between two, three, four or more bread pans. The pans are usually placed with the longitudinal length extending across the conveyor belt, and are moved as indicated by the arrow 15 through the pan cleaning machine 10. The pans are individual relatively deep compartments, and it is necessary to get various debris, such as crumbs, seeds, and crusts out of the pans before the pans are once again used.

The pans are usually metal, and correspond to the bun cleaning pans shown in U.S. Pat. No. 4,044,420, except they are deeper, longer and wider in their individual compartments.

Figure 3:
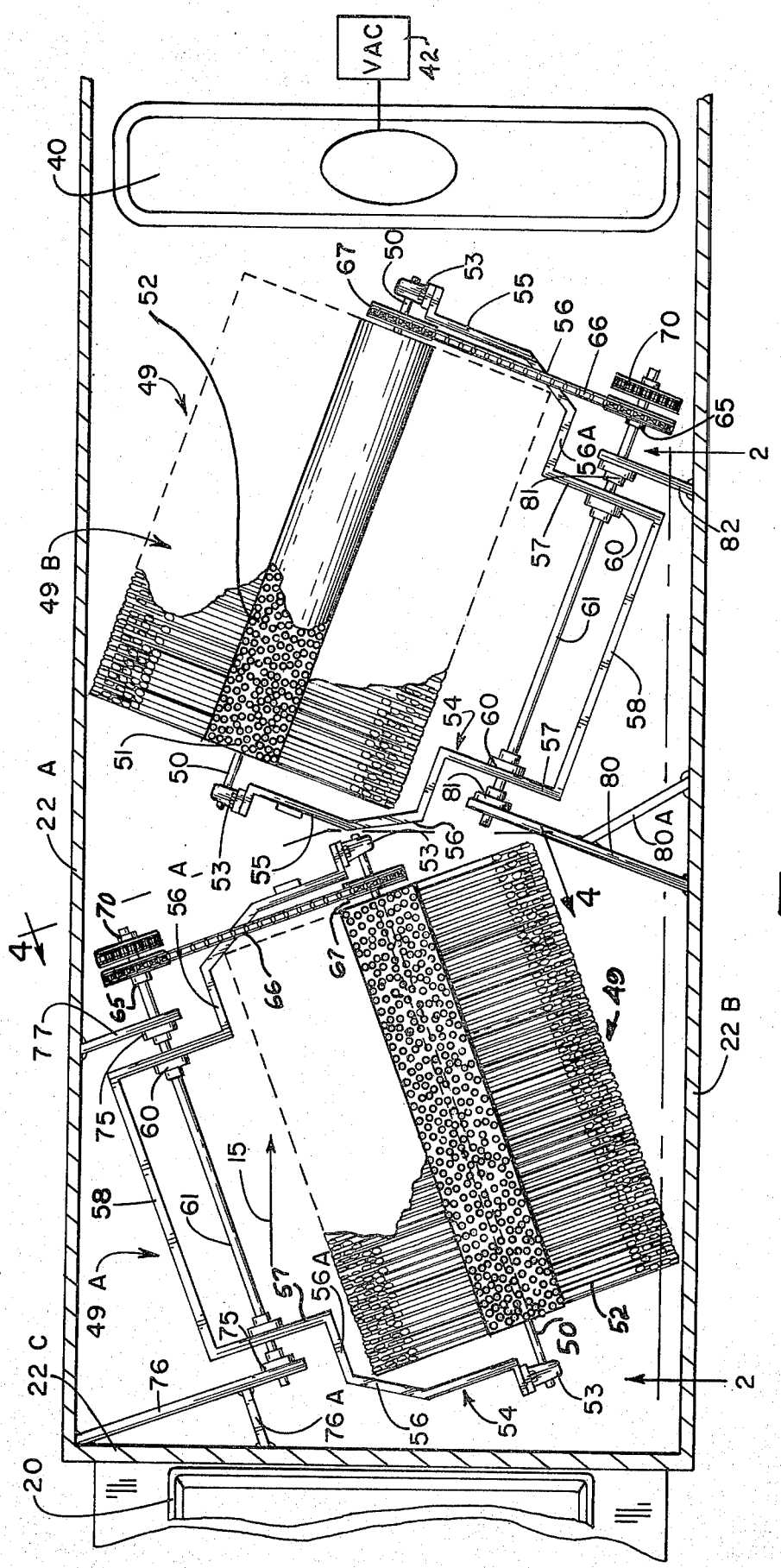
FIG. 3 is a sectional view taken generally along line 3—3 in FIG. 1.

An outer housing 22 has side walls 22A and 22B and also an input end wall 22C and an output end wall to form an open bottom enclosure (see FIG. 3). The housing 22 is mounted relative to the conveyor frame 16 on four arms 23,23, each of which is pivoted as at 24 to the respective side walls of the housing 22. Pivots 24 are on opposite sides of the housing, and the arms 23 also are positioned on opposite sides of the housing.

The pair of arms 23 in turn are fastened to ends of a shaft 25 which extends across the conveyor and is rotatably mounted in brackets 26 which are attached to the side members 16 of the conveyor frame. The arms or links 23 (two on each side) form a parallel linkage for raising or lowering the housing 22. The shafts 25 extend laterally across the conveyor underneath the conveyor, and each of the shafts 25 has an arm 30 drivably mounted thereon under the conveyor or to which a drive link 31 is pivotally mounted as at 32,32 at its opposite ends. The arms 30,30 are parallel, and thus move simultaneously. The link 31 carries a threaded bracket 33 through which a long crank 34 is threadably mounted. The loads on the crank 34 in turn are reacted through a bracket 35 back to the machine frame, as shown schematically. Upon turning the crank drive link 31 can be moved longitudinally to thereby pivot the shafts 25 and the support arms or links 23 and raise or lower the entire housing 22.

At the discharge end of the housing 22, as shown schematically, and also as disclosed in U.S. Pat. No. 4,044,420, a vacuum head 40 is mounted in position to extend transversely across the conveyor. The vacuum head 40 has a vacuum chamber 41 connected to a vacuum source 42. The chamber 41 is of size so that it will tend to suck up materials in each of the individual bread pans from the pan 20. The vacuum head also has air pipes indicated at 43 at the leading and trailing edges, and these are supplied air by a source of air pressure 44. The vacuum hood 40 will tend to suck up material, and the air pressure from orifices in pipes 43 will tend to blast the material out, just as described in my previous U.S. Pat. Nos. 4,044,420 and 3,999,238.

The cleaning assembly of the present device includes a pair of rotatable brush assemblies indicated generally at 49. Each of the brush assemblies 49 includes a core member 51, and a plurality of bristles which are indicated generally and schematically at 52. The brush construction is well known, and the bristles are generally of nylon or similar material that are relatively stiff. The diameter of the bristles can be in the range of $\frac{1}{8}$ to 3/16 of an inch or so, and the bristle length generally is in the range of eight inches.

The brush construction is quite well known, and each of the brush core members has a shaft 50 extending outwardly from the ends. The shafts 50 in turn are rotatably mounted in suitable bearings 53 which are on opposite sides of the brush, and the bearings are in turn mounted onto a brush support pivot bracket 54. Each of the pivot brackets 54 is substantially identically constructed, but they are mounted on opposite sides of the housing 22, and thus their pivot axes are at opposite sides of the conveyor.

Each of the U shaped brackets 54 includes side members 55, offset bracket sections 56, which angle around the outer end edges of the brush. A portion 56A of the bracket is outside the path of rotation of the brush and extends inwardly toward the center of the brush from each end. The U shaped brackets 54 include mounting legs 57 which are joined to the section 56 and portion 56A, and a cross tie piece 58 at the back adjacent the respective side wall 22A or 22B of housing 22.

The mounting legs 57 each in turn have a bearing 60 mounted thereon, and a shaft 61 is mounted through the bearing 60 on each of the mounting legs 57. The shafts 61 in turn are shafts that are used as counter shafts or "jack shafts" for driving the brush shafts 50 and at the same time form pivot shafts for the brackets 54 to permit the brushes 49 to pivot up and down about the axis of the respective shaft 61. As shown, each of the shafts 61 has a drive sprocket 65 mounted thereon which in turn drives a chain 66 to drive a sprocket 67 on the respective shafts 50. Further, drive sprockets 70 are mounted to the exterior of the sprocket 65 on the shaft 61 and drive chains indicated schematically at 71 are driven from motor-gear reducer sets 72 for the respective brushes. The motor gear reducer sets 72 are mounted onto the top wall 22D of the housing 22 in a suitable manner. Individual motors are driven from electric power sources for driving each of the respective brushes 49.

The brush assembly 49A is the leading end brush, that is the first brush in series and the counter shaft-pivot shaft 61 for that particular device is mounted in bearings 75,75 which are mounted in turn on a first bracket 76 near the input end wall 22C and is braced back to the end wall 22C with a brace 76A.

A second mounting bracket 77 is braced to the wall 22A, and the bearing 75 rotatably and pivotally mounts the shaft 61 in such bracket.

It can be therefore seen from looking in FIG. 3 for example that the shaft 61 is at an oblique angle with respect to the side wall 22A, and also then with respect to the direction of travel of the conveyor belt which is indicated in FIG. 3 by the arrow 15 as well.

The trailing brush of the two brush assembly is indicated at 49B and has its counter-pivot shaft 61 mounted in the first bracket 80 that is braced with a brace 80A back to the side wall 22B, and which is opposite from and actually downstream with respect to the direction of travel of the conveyor from the brush assembly 49A. Bracket 80 has a bearing 81 mounted at an outer end which rotatably and pivotally mounts the shaft 61. A second bracket 82 is mounted to the wall 22B, and also mounts a bearing 81 for rotatably and pivotally mounting the counter-pivot shaft 61 for the brush assembly 49B.

It can be seen that the vacuum head in FIG. 3 is just downstream from the brush assembly 49B.

It should be noted that the shaft 61 for the brush assembly 49B is also positioned at an oblique angle with respect to the direction of travel of the conveyor and the side wall 22B, but it is in opposite direction so that the first brush assembly 49A is skewed in one direction, and the second brush assembly 49B is skewed in the opposite direction, and that the brushes overlap in transverse direction across the conveyor, but have portions which extend outwardly beyond the path covered by the other brush. What this does is to insure that there is a good scrubbing action in the center portions of the housing where the pans travel, and slight shifting of the pans across the width of the housing does not adversely affect the scrubbing action.

Figure 2:
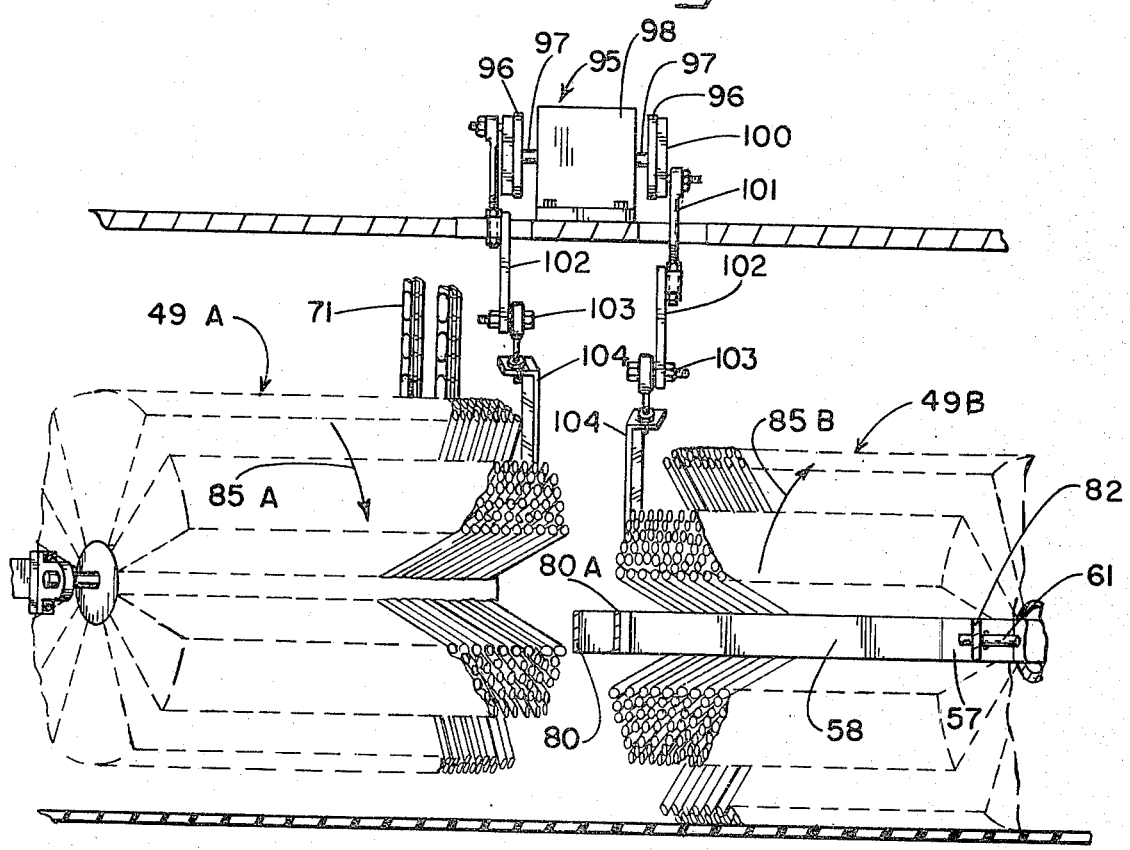
FIG. 2 is an enlarged side view showing a drive mechanism utilized with the device of the present invention with parts in section and parts broken away, taken generally on line 2—2 of FIG. 3.

Thus, each of the brushes is individually rotated in a desired direction, and generally the bottom bristles are traveling in toward the center of the machine as generally shown by the arrows 85A and 85B in FIG. 2. The axis of rotation of the brushes is generally in the range of twenty degrees from the direction of movement of the conveyor indicated by the arrow 15, and thus also twenty degrees with respect to the side walls.

The brushes 49 are driven independently through the respective motor gear reducer unit 72, of conventional design, and usually driven in the range of twenty five to thirty rpm.

In order to enhance the action of the pans to loosen and sweep out debris, such as seeds, crust, and crumbs from the corners of the pans, the brushes are cycled up and down about the pivot axis defined by the shafts 61 so that as the brushes rotate the bristles tend to be forced longitudinally or end wise into the pans, thereby more-or-less spearing or jabbing crumbs and loosening them from the corners of the pans as the brushes cycle.

Figure 4:
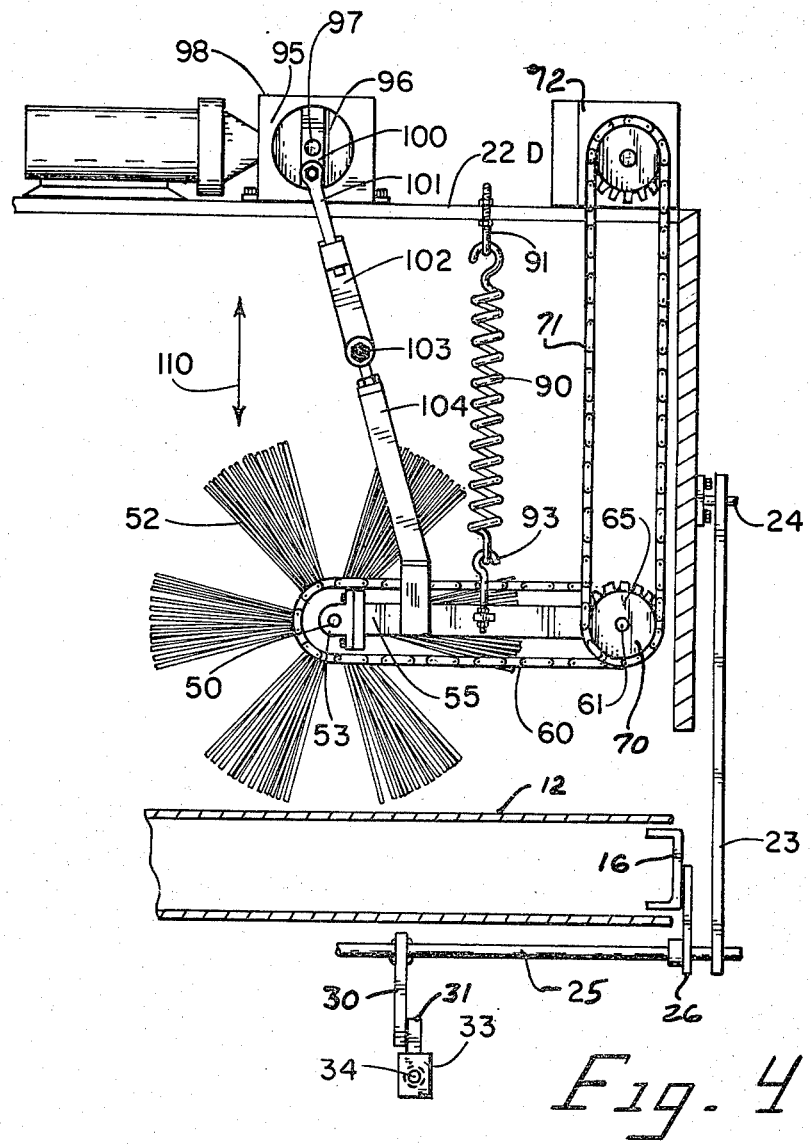
FIG. 4 is a sectional view taken as on line 4—4 in FIG. 3.

The frame assemblies 54 and the brushes 49 are counterweighted back to the overhead frame of the housing 22 through the use of tension springs shown generally in FIG. 4. As shown a longitudinally extending tension spring 90 is used on each frame and each spring has a first end connected to a bracket 91 on a top cross member of the top wall 22D of the housing 22, and has a second end connected to a bracket 93, which attaches to one arm member 55 of the respective frame 54 at location between the transition section 56 and the bearing mounting for the bearing 53.

Either one or both of the brackets 91 or 93 can be adjustable in a suitable manner to adjust the tension in the spring 90 and thus control the amount of counterweight force that is provided tending to counterweight the weight of the brushes and the frame 54. The force downward on the brush is adjusted so that there is a slight downward force, but the force is fairly well counterweighted.

The brushes 49, and their pivoting frames 54 are reciprocated through the use of a drive assembly shown at 95 comprising an eccentric crank member 96 which is driven from the output shaft 97 of a motor gear reducer 98. The motor is selected so that it will drive at the desired speed, and the crank pin shown at 100 operates on a rod end bearing on a link 101 that is adjustable in a bracket 102 which in turn is pivoted on a rod end 103 that is connected to a fixed link 104 on the respective side member 55. Links 104 are straps fastened securely to one of the side members 55 of each brush assembly adjacent to the spring mounting 93.

The crank throw of the pin 100 is generally in the range of one inch, so that the total amount of oscillation of the brushes up and down as indicated by the arrow 110 is in the range of two inches. This also can be adjusted if desirable by having an adjustable crank, and the speed of oscillation is generally in the range of one hundred to one hundred seventy five rpm on the crank disc 96, and thus about one hundred to one hundred seventy five oscillations per minute.

As the brushes oscillate up and down, the stroke permits the bristles to raise up and down inside the pans. As the brushes move up and down, they tend to scrub the sides of the pans and at the same time rotate to flick debris out of the pans. Further, the longitudinal forces on the bristles tends to force or jab the bristles. The bristles bend slightly and to go into the far corners of the pans to loosen all debris. Thus there is a good scrubbing action by the oscillation at the same time the unit rotates to tend to poke, push and loosen materials by longitudinal forces on the bristles at the same time they are rotating.

Of course, more than one spring 90 can be mounted on each of the brush assemblies, and the arrangement for mounting the springs can be of any desired arrangement. Likewise, if the oscillations need to be increased or decreased this can be done and the stroke of the movement of the brushes as indicated by the arrow 110 can be changed.

The various drive components are shown largely schematically because the basic brush, housing, and brush rotational drive arrangement is shown in my previous patents. However, the improvement of oscillating the brush relative to the conveyor to provide a component of force generally axially along the brush bristles as they rotate tends to dislodge and loosen material much more satisfactorily than in previous arrangements.

Although the present invention has been described with reference to preferred embodiments, workers skilled in the art will recognize that changes may be made in form and detail without departing from the spirit and scope of the invention.

What is claimed is:

1. A cleaning apparatus for a pan to be cleaned, and wherein such pan is movable by a conveyor, said cleaning apparatus comprising a frame, said pan to be cleaned being moved generally in a plane along said frame from a first end to a second end, at least one brush means mounted on said frame and having elongated bristles extending outwardly in position to engage a pan moving along the plane, means to rotate said brush means about an axis so that the bristles engage a pan moving in the plane and move material from a pan, and power means to oscillate the brush means toward and away from a pan being moved in the plane at the same time as the brush means rotates, said means to oscillate causing the bristles to be moved in longitudinal direction so the ends of the bristles are moved against the pan intermittently as the brush means rotates.

2. The apparatus of claim 1 wherein said frame includes means to pivotally mount said brush means about an axis generally parallel to the plane, spring means counterbalancing said means to pivotally mount and wherein the means to oscillate said brush means directly lifts and lowers said brush means away from and toward said pan at a rate of between one hundred and one hundred and seventy five oscillations per minute.

3. The apparatus as specified in claim 2 wherein said means to pivotally mount comprises a pivot bracket having legs that straddle said brush means on opposite ends thereof and rotatably mount said brush means at its opposite ends, a shaft generally parallel to the axis of rotation of the brush means mounting said pivot bracket with respect to the frame, said shaft being rotatably mounted relative to both said frame and the pivot bracket, drive means to rotatably drive said shaft, and drive means operably extending from said shaft to said brush means whereby said shaft forms a pivot shaft and also rotatably drives said brush means.

4. The apparatus as specified in claim 1 wherein the brush means comprise two brushes each rotatably mounted on said frame and positioned to be sequentially engaged by a pan moving relative to the frame along said plane, each of said brushes having an axis of rotation positioned at an oblique angle with respect to the direction of travel of a pan moving in the plane.

5. The apparatus of claim 4 wherein each of the brushes is at an oblique angle which inclines the respective brush in a different direction from the other.

6. The apparatus of claim 5 wherein the path of each of said brushes overlaps the path of the other across the width of a pan moving in the plane.

7. The apparatus as specified in claim 1, wherein said means to oscillate is powered to provide oscillations at the rate of between one hundred and one hundred and seventy five oscillations per minute.

8. A cleaning apparatus for a generally rectilinear pan forming a receptacle, said cleaning apparatus comprising a frame, means on said frame to support and move a pan to be cleaned generally in a plane along said frame from a first end to a second end, a housing mounted on said frame, brush means mounted on the housing comprising two rotary brushes having rotational axes and having bristles extending outwardly to engage pans moving along the plane, means to rotate said brushes about their axes, said axes being generally parallel to the plane and each brush axis being inclined with respect to the direction of movement of a pan moving along said plane in opposite direction from the other brush axis so that the respective axes of rotation are oblique to sides of such a pan and the bristles tend to engage such a pan and remove material from such a pan, and means to oscillate both of the brushes toward and away from said plane as the brushes are rotated.

9. The apparatus as specified in claim 8 and means to pivotally mount each of said brushes to permit them to be oscillated comprising a separate pivot bracket for each brush, each pivot bracket having a pair of legs that straddle the respective brush on opposite sides thereof and rotatably mount the respective brush at its opposite ends, a separate shaft generally parallel to the axis of rotation of the respective brush mounting its associated bracket with respect to the frame, each said shaft being rotatably mounted relative to both its pivot bracket and said frame, first drive means to drive each of said shafts, and second drive means from each of said shafts to its respective brush, said shafts thereby forming a pivot and also rotatably driving its respective brush.

10. The apparatus of claim 9 and spring means for counterbalancing the weight of each brush relative to the housing.

11. The apparatus of claim 9 wherein said means to oscillate the brushes comprises crank members mounted on said housing above the brushes, a link connected between said crank members and the respective brushes, and means to rotate said crank members to cause said links and brushes to reciprocate.

* * * * *